B. H. BROWN, G. W. EDWARDS & E. T. MANWELL.
AUTOMATIC HEADLIGHT.
APPLICATION FILED MAR. 10, 1913.
1,080,256.
Patented Dec. 2, 1913.
2 SHEETS—SHEET 1.
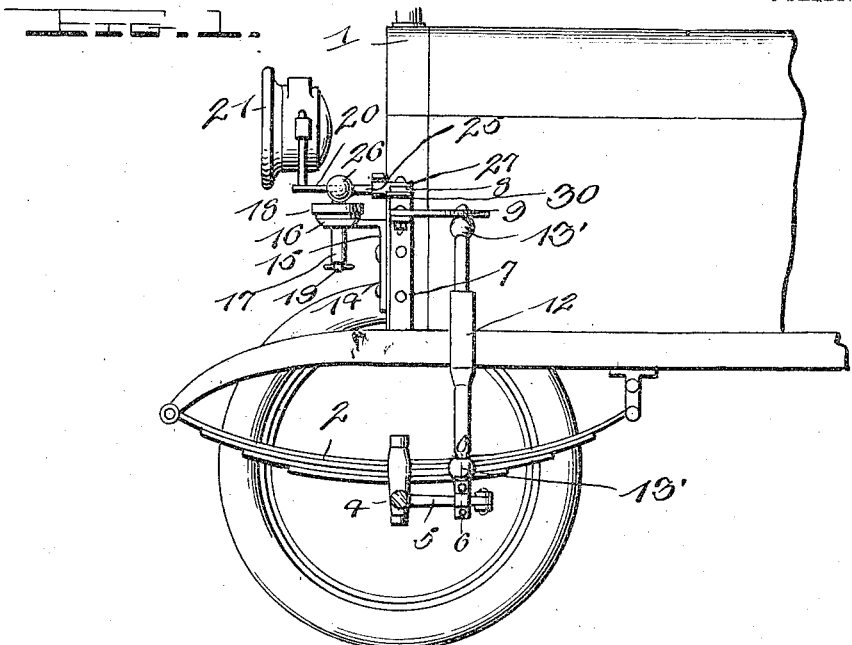
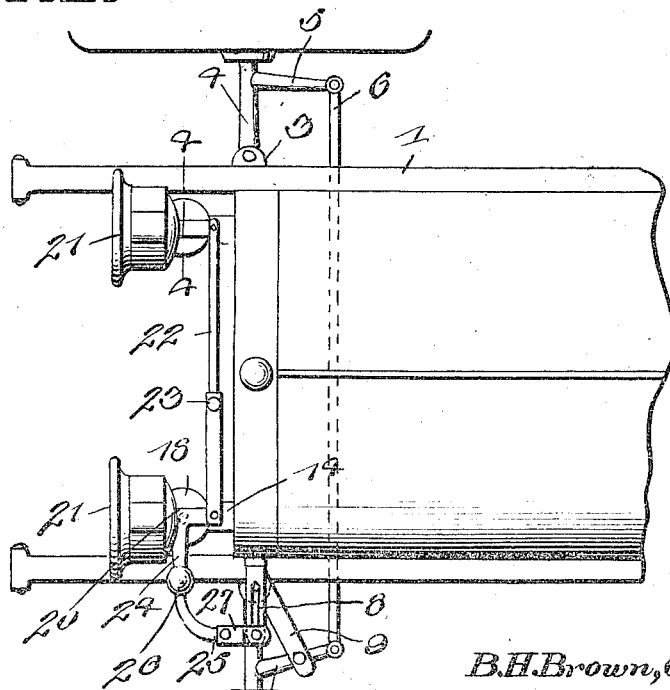
Witnesses
Chas. L. Griesbauer.
A. B. Norton.
Inventor
B. H. Brown, G. W. Edwards
and E. T. Manwell,
By Watson E. Coleman.
Attorney

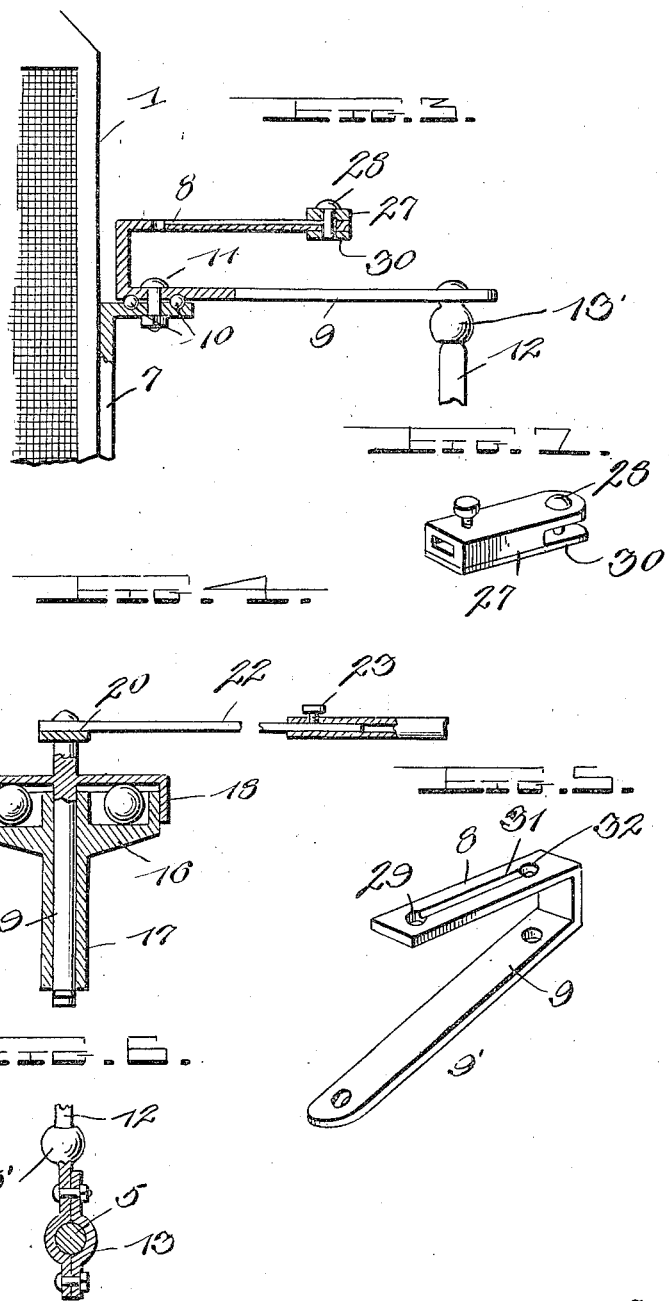

UNITED STATES PATENT OFFICE.

BENJAMIN H. BROWN, GEORGE W. EDWARDS, AND EDMUND T. MANWELL, OF MARYSVILLE, CALIFORNIA.

AUTOMATIC HEADLIGHT.

1,080,256.  Specification of Letters Patent.  Patented Dec. 2, 1913.

Application filed March 10, 1913. Serial No. 753,401.

*To all whom it may concern:*

Be it known that we, BENJAMIN H. BROWN, GEORGE W. EDWARDS, and EDMUND T. MANWELL, citizens of the United States, residing at Marysville, in the county of Yuba and State of California, have invented certain new and useful Improvements in Automatic Headlights, of which the following is a specification, reference being had to the accompanying drawings.

This invention comprehends certain new and useful improvements in head lights for vehicles and relates more particularly to automatic head lights designed for use on motor vehicles.

The primary object of the invention is to provide an automatic head light which will always throw its rays in the path of the vehicle to which it is attached and which when desired, may be easily rendered inoperative.

A further object of the invention is to provide a device of this nature which shall be extremely simple in construction and which may be easily applied to any make of car.

The invention also aims to generally improve devices of this nature to render them more useful and commercially desirable.

With these and other objects in view, as shall become apparent as the description proceeds, the invention consists of certain novel features of construction and arrangement of parts as we shall hereinafter fully describe and claim.

For a complete understanding of our invention, reference is to be had to the following description and accompanying drawings, in which—

Figure 1 is a side elevation of the front portion of an automobile equipped with our automatic head light. Fig. 2 is a top plan view showing our device applied to the frame of an automobile. Fig. 3 is a front elevation partly in section showing a portion of our invention. Fig. 4 is a view through one of the lamp supporting brackets taken on the plane of line 4—4 in Fig. 2. Fig. 5 is a perspective view showing the angular connecting member, and Fig. 6 is a view taken on the line 6—6 in Fig. 1. Fig. 7 is a detail perspective view of the socket member.

Similar parts are referred to in the following description and designated in the accompanying drawing by like reference characters.

Referring to the drawing by numerals 1 designates the fore part of an automobile supported by the springs 2 resting on the axle 3, which axle is provided, as is customary, with stub spindles 4. Each spindle is provided with a rearwardly extending steering arm 5 which is connected to the opposite steering arm by the steering rod 6. A supporting bracket 7 is secured to the vehicle in vertical alinement with the axle 3 and has its upper end bent outwardly at right angles to the vertical portion. This outwardly extending upper end portion of the bracket 7 supports a connecting member having an upper arm 8 which normally extends outwardly at right angles to the machine and a lower arm 9 which also projects outwardly but has its outer end positioned somewhat in the rear of the upper arm 8. These arms are formed from a single piece of metal and extend from a vertical central portion which serves to space the arms one above the other. Ball bearings 10 are held between the lower arm 9 and the bracket 7 by annular race ways formed in said members. A bolt 11 passes through the inner end of the arms 9 and the outward extending portion of the bracket 7 and serves to hold the connecting member in position on said bracket. A vertical telescopic connecting rod 12 is secured at its lower end to the steering arm 5 by the clip 13 and has its upper end connected to the outer end of the arm 9. These connections are made through the medium of suitable joints 13'.

Lamp supporting brackets 14 are secured to the front of the automobile 1. Each comprises a vertical portion 15 which supports a base plate 16, said base plate being formed with an annular channel in its upper face and provided with a downwardly extending sleeve 17. A cap plate 18 provided with a spindle 19 is retained on the base plate by a pin passing through the end of the spindle 19. Ball bearings are interposed between the cap and base plates and eliminate, as far as possible, frictional resistance. Each cap plate is provided with a longitudinally extending arm 20 connected intermediate of its ends to a vertical standard formed integral with the center of the upper surface of the cap plate. The forward portions of the arms 20 support the lamps 21 and the rear ends of these arms are connected by the telescopic bar 22. This bar is pivotally connected at its ends to the arms 20 and may be secured in any adjusted position by the set screw 23. One of the arms 20 is provided intermediate its ends with an outwardly extending arm 24 which is connected to the rearwardly extending rod 25 through the medium of a ball and socket joint 26. The rear end of the rod 25 is adjustably secured within the socket 27, said socket being formed at its rear end with a longitudinal projection to which is rigidly secured a downwardly extending connecting pin 28, which is adapted to fit within the circular opening 29 in the outer end of the arm 8. A flat spring 30 is secured at its forward end in any suitable manner to the lower face of the socket 27 and projects rearwardly beyond the end of said socket. This spring, by engaging the under side of the arm 8, serves to hold the connecting pin 28 in position.

In order that the head lights may be rendered inoperative when desired, we have provided the arm 8 with a longitudinal groove 31 which communicates at its inner end with the circular opening 32. By removing the connecting pin 28 from the opening 29 and sliding it along in the groove until it engages the walls of the opening 32, the lamps 21 are prevented from turning with each motion of the steering gear. It will be seen that since the opening 32 is in vertical alinement with the bolt 11, a pivotal motion of the connecting member will not affect the socket 27 and therefore, the lamps will not be moved.

It will be seen from the foregoing description that when the steering rod 6 is shifted laterally in either direction its motion is transmitted through the medium of the vertical rod 12 and the horizontal connecting rod 25 to the lamp brackets 14. When the automobile is turned to the right, the action of the steering rod upon the aforementioned connecting members is such as to cause the lights to also shift to the right, thus always throwing their rays directly in the path of the machine.

It is to be understood that while we have shown a preferred embodiment of our invention, we do not wish to be limited to the exact construction and arrangement of the parts herein described and shown, but may make such changes as fall within the scope and spirit of the invention as defined by the appended claims.

Having thus described our invention, what we claim is:—

1. In a device of the character described, the combination with the steering mechanism of a vehicle, a laterally extending connecting member pivotally connected to the body of the vehicle, lamps pivotally connected to the vehicle forwardly of said connecting member, a rod connecting said lamps, a vertical rod connected at its lower end to the steering mechanism and at its upper end to said connecting member, a rearwardly extending rod connected at its forward end to one of said lamps, the rear end of said rearwardly extending rod being connected to said connecting member, and means whereby the rear end of said rearwardly extending rod may be adjusted longitudinally of said connecting member to render the device inoperative, as and for the purpose described.

2. In a device of the class described, the combination with the steering mechanism of a vehicle, of a connecting member pivotally connected to the body of the vehicle, said member comprising a pair of outwardly projecting arms arranged one above the other, a vertical rod connected at its lower end to the steering mechanism and at its upper end to the lower arm of the connecting member, lamps pivotally connected to the vehicle, a rod connecting said lamps, one of said lamps having an outwardly projecting arm, and a rod connected at its forward end to said lamp and at its other end to the upper arm of said connecting member, as and for the purpose described.

3. In a device of the class described, the combination with the steering mechanism of a vehicle, of a connecting member pivotally connected to the body of the vehicle, said connecting member comprising a pair of outwardly projecting arms arranged one above the other, a vertical rod connected at its upper end to the lower arm of said connecting member and at its lower end to the steering mechanism, lamps pivotally connected to the body of said vehicle forwardly of said connecting member, a rod connecting said lamps, and a rearwardly extending rod pivotally connected at its forward end to one of said lamps, said rearwardly extending rod being adjustably connected at its rear end to the upper arm of said connecting member, as and for the purpose described.

4. In a device of the character described, the combination with the steering mechanism of a motor vehicle, a connecting member comprising a pair of outwardly projecting arms arranged one above the other and pivotally connected to the body of the vehicle, a vertical rod connected at its upper end to the lower arm of said connecting member and at its lower end to the steering mechanism, lamps pivotally connected to the body of said vehicle, a rod connecting said lamps, the upper arm of said connecting member being provided with a plurality of openings, and a rearwardly extending rod pivotally connected at its forward end to one of said lamps, said rod being connected at its rear end in one of the openings in the upper arm of said connecting member, as and for the purpose described.

In testimony whereof we hereunto affix our signatures in the presence of two witnesses.

BENJAMIN H. BROWN.
GEORGE W. EDWARDS.
EDMUND T. MANWELL.

Witnesses:
  TOM E. BEVAN,
  WILLIAM P. RICH.